US009838591B2

United States Patent
Ono

(10) Patent No.: US 9,838,591 B2
(45) Date of Patent: Dec. 5, 2017

(54) IMAGING APPARATUS AND IMAGING SYSTEM FOR GENERATING A SIGNAL FOR FOCUS DETECTION

(71) Applicant: CANON KABUSHIKI KAISHA, Tokyo (JP)

(72) Inventor: Toshiaki Ono, Ebina (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/148,852

(22) Filed: May 6, 2016

(65) Prior Publication Data

US 2016/0337606 A1  Nov. 17, 2016

(30) Foreign Application Priority Data

May 15, 2015 (JP) .................................. 2015-100292

(51) Int. Cl.
*G03B 13/00* (2006.01)
*H04N 5/232* (2006.01)
*H04N 5/369* (2011.01)
*H04N 5/374* (2011.01)

(52) U.S. Cl.
CPC ....... *H04N 5/23212* (2013.01); *H04N 5/3696* (2013.01); *H04N 5/3742* (2013.01)

(58) Field of Classification Search
CPC .. H04N 5/3742; H04N 5/378; H04N 5/23212; H04N 5/3696; H04N 5/3741; H04N 5/3745; H04N 9/045; H04N 5/345; H04N 5/3452; H04N 5/3456; H04N 5/3458; H04N 5/347; H01L 27/14601
See application file for complete search history.

(56) References Cited

U.S. PATENT DOCUMENTS

| | | | |
|---|---|---|---|
| 6,600,160 B2 * | 7/2003 | Kobayashi | ........ H01L 27/14659 250/370.09 |
| 6,690,421 B1 * | 2/2004 | Yamada | ............... H04N 3/1575 348/272 |
| 6,838,651 B1 * | 1/2005 | Mann | ................ H01L 27/14645 250/208.1 |

(Continued)

FOREIGN PATENT DOCUMENTS

| JP | 2002-84548 A | 3/2002 |
|---|---|---|
| JP | 2012-191401 A | 10/2012 |

(Continued)

*Primary Examiner* — Chia-Wei A Chen
(74) *Attorney, Agent, or Firm* — Canon USA, Inc., IP Division

(57) ABSTRACT

Ones of row addresses and column addresses of pixels in a first group are the same as those of a second group. A range of the others of the row addresses and the column addresses of the first group excludes that of the second group. A range of the others of row addresses and column addresses is included in a range of the others of the row addresses and the column addresses of the first and second groups. A portion of the range of the row addresses and the column addresses of the first group overlaps with that of the third group, and the other portion of the range of the first group does not overlap with that of the third group. Intra-group addition signals of the first, second, and third groups are obtained.

11 Claims, 15 Drawing Sheets

(56) References Cited

U.S. PATENT DOCUMENTS

| | | | | |
|---|---|---|---|---|
| 6,992,714 B1* | 1/2006 | Hashimoto | ............ | H04N 9/045 348/273 |
| 2007/0206940 A1* | 9/2007 | Kusaka | ................ | G03B 13/28 396/128 |
| 2008/0068683 A1* | 3/2008 | Kanno | ................ | H04N 9/045 358/530 |
| 2009/0190015 A1* | 7/2009 | Bechtel | ................ | H04N 5/2355 348/302 |
| 2010/0149392 A1* | 6/2010 | Hara | ................ | H04N 5/343 348/300 |
| 2010/0271526 A1* | 10/2010 | Okuzaki | ............ | H04N 5/3458 348/311 |
| 2011/0064195 A1* | 3/2011 | Kyushima | ............ | A61B 6/032 378/62 |
| 2011/0101205 A1* | 5/2011 | Tian | ................ | H04N 5/332 250/208.1 |
| 2011/0134297 A1* | 6/2011 | Takeda | ................ | H04N 5/3742 348/302 |
| 2011/0228144 A1* | 9/2011 | Tian | ................ | H04N 5/3575 348/243 |
| 2011/0267510 A1* | 11/2011 | Malone | ............ | H01L 27/14625 348/262 |
| 2011/0279721 A1* | 11/2011 | McMahon | ............ | H04N 5/345 348/302 |
| 2012/0086095 A1* | 4/2012 | Nishiyama | ............ | H04N 5/3765 257/432 |
| 2012/0119064 A1* | 5/2012 | Cieslinski | ............ | H04N 5/3653 250/208.1 |
| 2012/0286139 A1* | 11/2012 | Tashiro | ................ | H04N 5/3655 250/208.1 |
| 2013/0087683 A1* | 4/2013 | Mo | ................ | H04N 5/355 250/208.1 |
| 2015/0076323 A1* | 3/2015 | Mabuchi | ............ | H01L 27/14609 250/208.1 |
| 2015/0077590 A1* | 3/2015 | Kuriyama | ............ | H04N 5/3745 348/231.99 |
| 2016/0037093 A1* | 2/2016 | Mandelli | ................ | H04N 5/32 348/296 |
| 2016/0105622 A1* | 4/2016 | Tamaki | ................ | H04N 5/378 348/322 |
| 2017/0111598 A1* | 4/2017 | Tian | ................ | H04N 5/347 |

FOREIGN PATENT DOCUMENTS

| | | |
|---|---|---|
| JP | 2013-211833 A | 10/2013 |
| WO | 03/034714 A1 | 4/2003 |

* cited by examiner

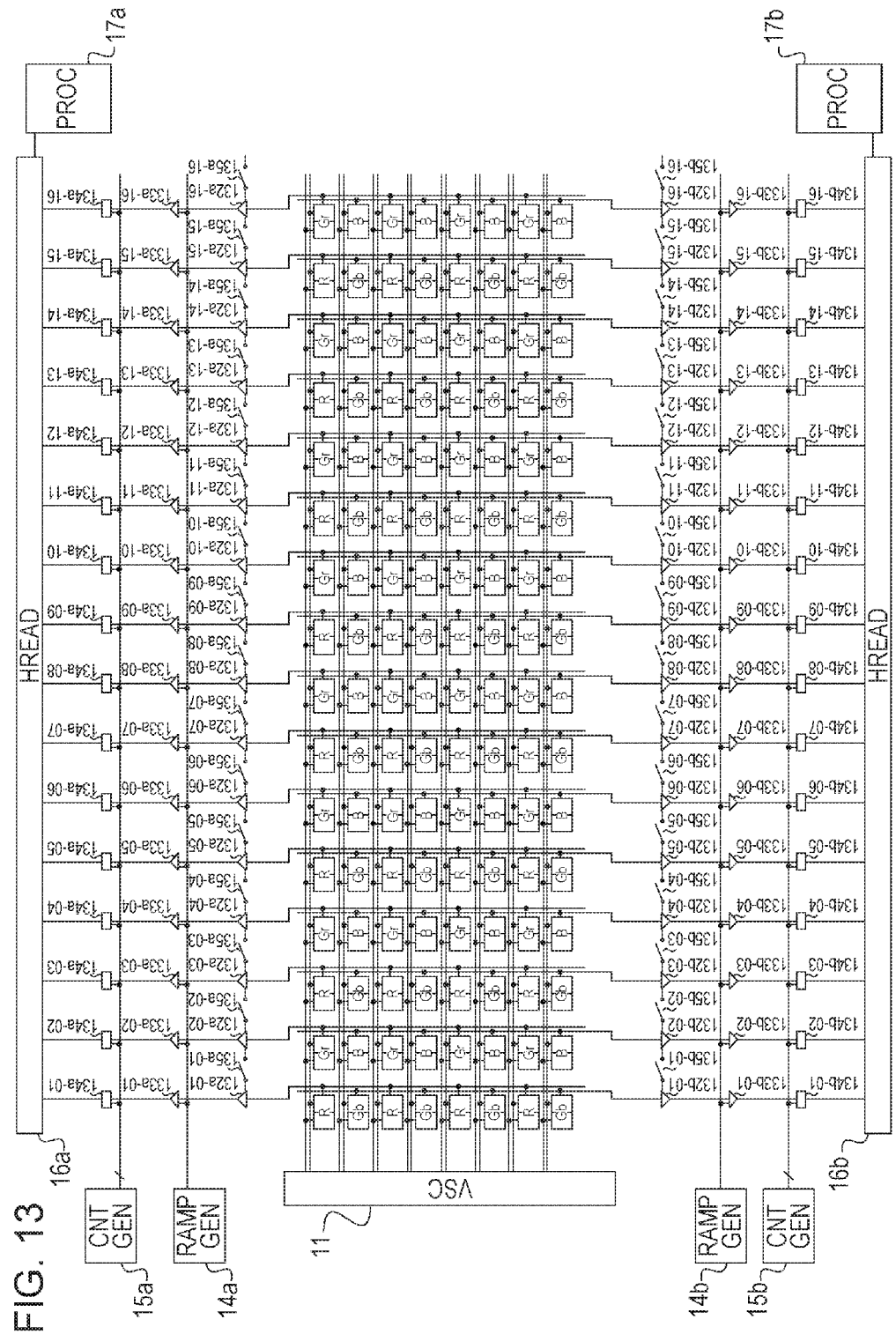

IMAGING APPARATUS AND IMAGING SYSTEM FOR GENERATING A SIGNAL FOR FOCUS DETECTION

BACKGROUND OF THE INVENTION

Field of the Invention

The present invention relates to an imaging apparatus and an imaging system.

Description of the Related Art

An imaging element which generates a signal for generating an image outputs a signal for focus detection. Imaging apparatuses which perform image plane phase difference AF using such signals for focus detection have been used.

Japanese Patent Laid-Open No. 2013-211833 discloses a configuration in which light transmitted through a microlens is incident on a plurality of photoelectric conversion units. Pixels output first signals based on charge generated by a number of the plurality of photoelectric conversion units and second signals based on charge generated by all the plurality of photoelectric conversion units. In Japanese Patent Laid-Open No. 2013-211833, the number of signals based on the first signals output from imaging elements is smaller than the number of signals based on the second signals.

In the technique disclosed in Japanese Patent Laid-Open No. 2013-211833, a high-speed signal output operation performed by the imaging element while degradation of accuracy of focus detection is suppressed has not been sufficiently discussed.

SUMMARY OF THE INVENTION

According to an embodiment of the present invention, an imaging apparatus includes a plurality of pixels each of which includes a plurality of photoelectric conversion units. Each of the plurality of pixels outputs a first signal based on charge generated by one of the plurality of photoelectric conversion units. The imaging apparatus includes a first step of adding first signals of a plurality of pixels which have a same row address and consecutive column addresses, a second step of adding first signals which have the same row address and consecutive column addresses, and a third step of adding first signals which have the same row address and consecutive column addresses. Row addresses of the plurality of pixels having the signals added to one another in the first step are the same as row addresses having the signals added to one another in the second step, and column addresses of the plurality of pixels having the signals added to one another in the first step are different from column addresses having the signals added to one another in the second step. The row addresses having the signals added to one another in the first step are different from row addresses having the signals added to one another in the third step, a portion of a range of column addresses having the signals added to one another in the first step overlaps with a portion of a range of column addresses having the signals added to one another in the third step, and the other portions do not overlap with each other. The row addresses having the signals added to one another in the second step are different from the row addresses having the signals added to one another in the third step, a portion of the range of the column addresses having the signals added to one another in the second step overlaps with a portion of the range of the column addresses having the signals added to one another in the third step, and the other portions do not overlap with each other.

Further features of the present invention will become apparent from the following description of exemplary embodiments with reference to the attached drawings.

BRIEF DESCRIPTION OF THE DRAWINGS

FIG. 13 is a diagram illustrating a configuration of an imaging apparatus.

DESCRIPTION OF THE EMBODIMENTS

In the technique disclosed in Japanese Patent Laid-Open No. 2013-211833, a high-speed signal output operation performed by the imaging element while degradation of accuracy of focus detection is suppressed has not been sufficiently discussed.

Embodiments below relate to a technique of a signal output operation performed by an imaging element.

Hereinafter, the embodiments will be described with reference to the accompanying drawings.

First Embodiment

Figure 1:
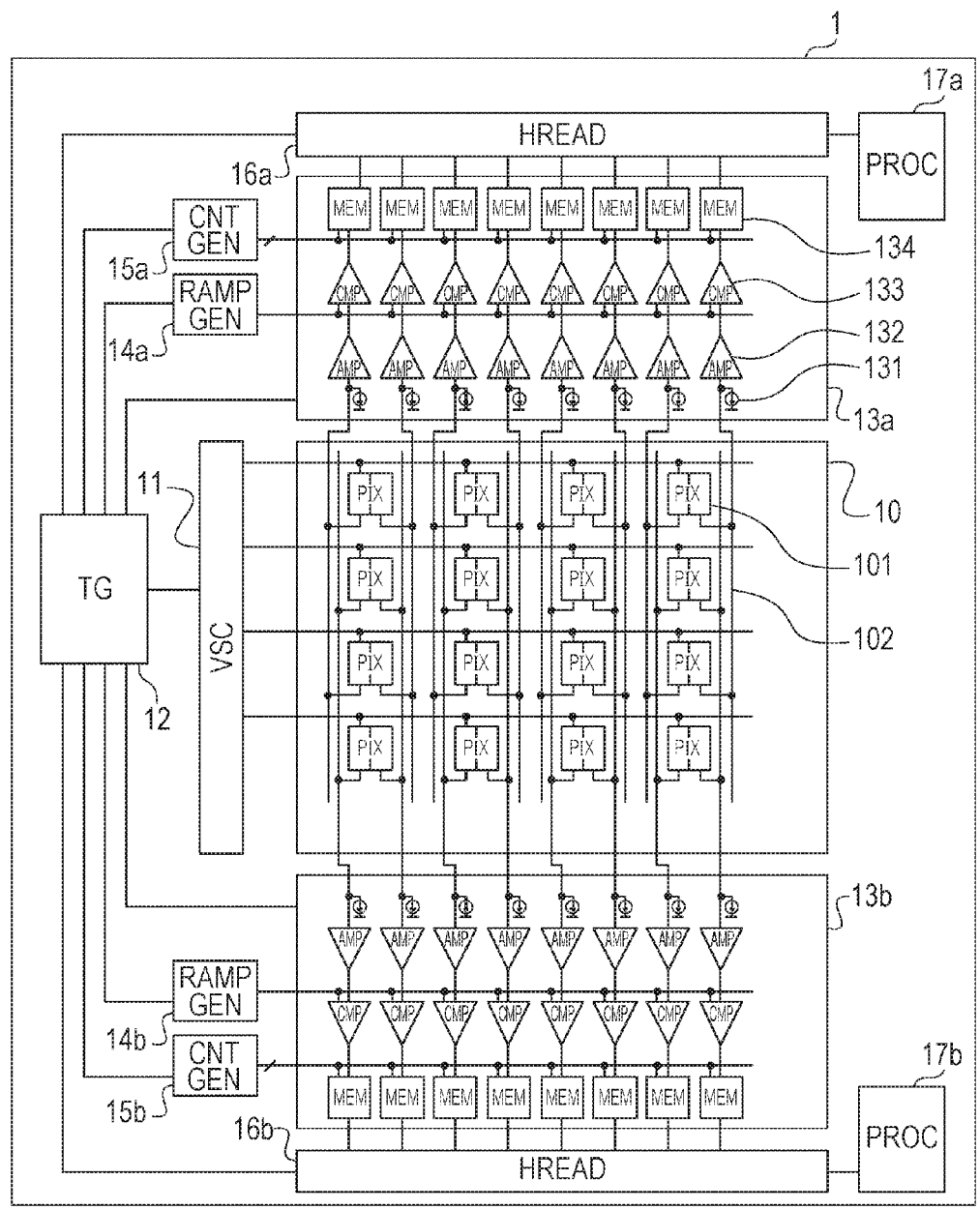
FIG. 1 is a diagram illustrating a configuration of an imaging apparatus.

FIG. 1 is a diagram schematically illustrating an imaging apparatus 1 according to a first embodiment. The imaging apparatus 1 is formed on a single semiconductor substrate.

A pixel unit 10 includes pixels 101 arranged in a matrix of a plurality of rows by a plurality of columns. Signals are output from the pixels 101 in a row selected by a vertical scanning circuit 11 to vertical output lines 102.

Of reading circuits 13a and 13b, the pixels 101 in a first row are connected to the reading circuit 13a, through the vertical output lines 102. Of the reading circuits 13a and 13b, the pixels 101 in a second row are connected to the reading circuit 13b, through the vertical output lines 102. Similarly, the pixels 101 in odd-numbered rows are connected to the reading circuit 13a and the pixels 101 in even-numbered rows are connected to the reading circuit 13b.

Each of the reading circuits 13a and 13b includes a current source 131. The current source 131 supplies current to the pixels 101 through the vertical output lines 102. Signals output from the pixels 101 to the vertical output lines 102 are input to amplifiers 132. Comparators 133 output comparison result signals representing results of comparison between outputs of the amplifiers 132 and ramp signals output from ramp generators 14a and 14b to memories 134.

Count signal generators 15a and 15b start counting of a clock in synchronization with start of change of potentials of the ramp signals. The count signal generators 15a and 15b generate count signals by counting the clock and supplies the count signals to the memories 134. The memories 134 store the count signals supplied from the count signal generators 15a and 15b when values of the comparison result signals are changed. Accordingly, the memories 134 store digital signal values corresponding to periods of time from start of change of potentials of the ramp signals to change of the values of the comparison result signals. The digital signal values are proportional to signals output from the pixels 101. Therefore, the signals stored in the memories 134 are digital signals obtained by performing AD conversion on the signals output from the pixels 101.

Horizontal scanning circuits 16a and 16b successively scan the digital signals stored in the memories 134 of the individual columns. By this scanning, the memories 134 of the individual columns output the digital signals to signal processors 17a and 17b.

The signal processors 17a and 17b process the values of the memories 134 of the individual columns so as to generate output signals.

The signals output from the signal processors 17a and 17b correspond to a signal output from the imaging apparatus 1.

Operation of the imaging apparatus 1 of FIG. 1 will be described in detail later with reference to FIG. 4.

Figure 2A:
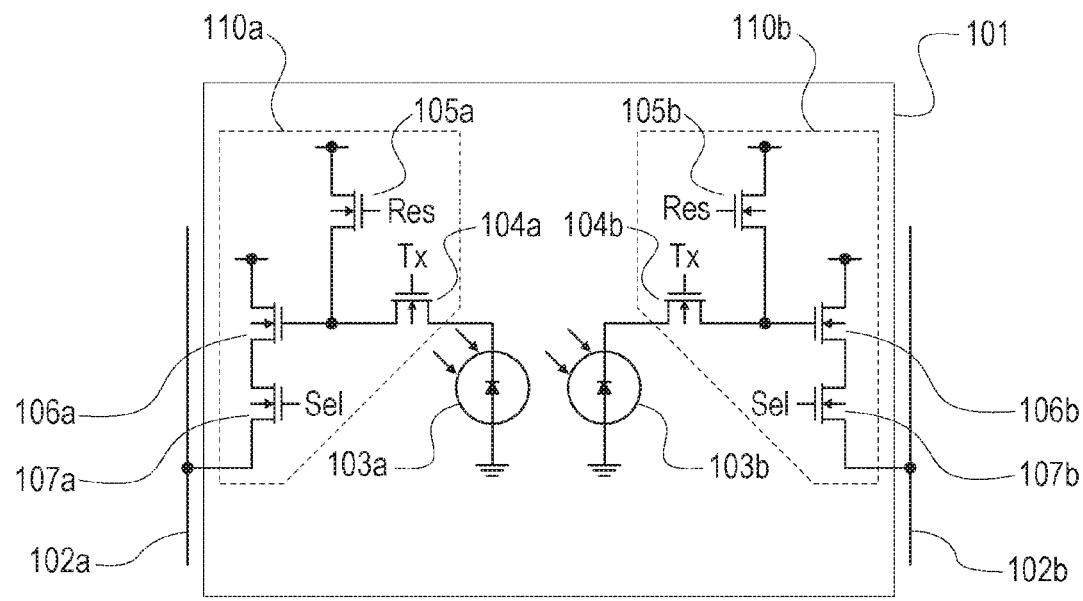
FIGS. 2A and 2B are diagrams illustrating a configuration of a pixel and an operation of the pixel, respectively.

FIG. 2A is a diagram illustrating an equivalent circuit of one of the pixels 101 according to this embodiment.

The pixel 101 includes two photodiodes 103a and 103b. The photodiodes 103a and 103b are first and second photoelectric conversion units included in the pixel 101. Pixel circuits 110a and 110b are connected to the two photodiodes 103a and 103b, respectively. The pixel circuit 110a includes a transfer transistor 104a, a reset transistor 105a, an output transistor 106a, and a selection transistor 107a. The pixel circuit 110b similarly includes a transfer transistor 104b, a reset transistor 105b, an output transistor 106b, and a selection transistor 107b. The vertical scanning circuit 11 supplies a signal Tx to the transfer transistors 104a and 104b. The vertical scanning circuit 11 supplies a signal Res to the reset transistors 105a and 105b. The vertical scanning circuit 11 supplies a signal Sel to the selection transistors 107a and 107b. Although not illustrated, each of the signals Tx, Res, and Sel is supplied from the vertical scanning circuit 11 to the pixels 101 in a plurality of columns arranged in a certain row in common. Assuming that the signal Res to be supplied from the vertical scanning circuit 11 to the pixels 101 in a plurality of columns in a certain row is in an active state, the reset transistors 105a and 105b of the pixels 101 in the plurality of columns in the certain row are turned on. The relationship between the vertical scanning circuit 11 and the pixels 101 in the plurality of columns in the certain row in the case of the signal Res is similarly applied to those in cases of the other signals Tx and Sel.

Figure 2B:
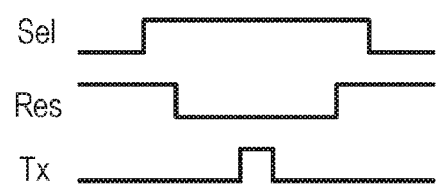

FIG. 2B is a diagram illustrating operation of the pixel 101.

The vertical scanning circuit 11 activates the signal Sel to be supplied to the pixels 101 in the certain row. By this, the selection transistors 107a and 107b of the pixel 101 in the certain row are turned on. Accordingly, the output transistors 106a and 106b of the pixel 101 in the certain row are connected to the corresponding vertical output lines 102a and 102b.

The vertical scanning circuit 11 brings the signal Res to be supplied to the pixel 101 in the certain row into an inactive state. By this, the reset transistors 105a and 105b of the pixel 101 in the certain row are turned off. Accordingly, reset of input nodes of the output transistors 106a and 106b are cancelled. Here, signals based on potentials of the input nodes of the output transistors 106a and 106b in which the reset is cancelled are supplied from the selection transistors 107a and 107b to the vertical output lines 102a and 102b.

The vertical scanning circuit 11 brings the signal Tx to be supplied to the pixel 101 in the certain row into an active state. By this, transfer of charge accumulated by the photodiodes 103a and 103b to the input nodes of the output transistors 106a and 106b is started.

The vertical scanning circuit 11 brings the signal Tx to be supplied to the pixel 101 in the certain row into an inactive state. By this, the transfer of the charge accumulated by the photodiodes 103a and 103b to the input nodes of the output transistors 106a and 106b is terminated.

The output transistors 106a and 106b output signals based on the charge of the photodiodes 103a and 103b transferred to the input nodes thereof to the vertical output lines 102a and 102b through the selection transistors 107a and 107b.

In this way, the signal based on the charge accumulated by the photodiode 103a is supplied to the vertical output line 102a from the output transistor 106a through the selection transistor 107a. This signal is referred to as an A signal. The A signal is a first signal output from the pixel 101 based on the charge accumulated by one of the plurality of photoelectric conversion units. Similarly, the signal based on the charge accumulated by the photodiode 103b is supplied to the vertical output line 102b from the output transistor 106b through the selection transistor 107b. This signal is referred to as a B signal. The B signal is a second signal output from the pixel 101 based on the charge accumulated by the other of the plurality of photoelectric conversion units.

Figure 3A:
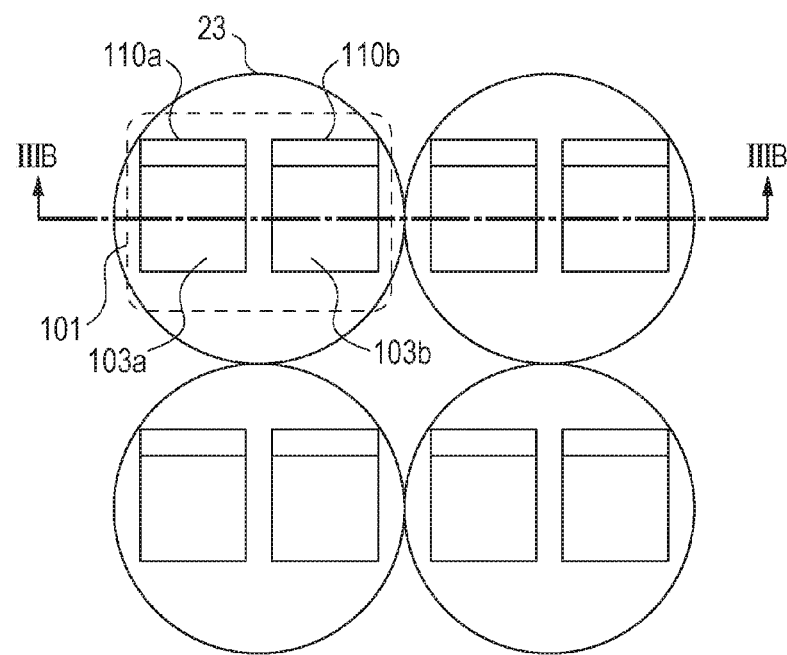
FIG. 3A is a plan view illustrating a configuration of pixels and FIG. 3B is a cross-sectional view illustrating a configuration of pixels.

FIG. 3A is a plan view schematically illustrating the pixels 101 according to this embodiment. Each of the pixels 101 includes the first photodiode 103a, the second photodiode 103b, the pixel circuit 110a connected to the photodiode 103a, and the pixel circuit 110b connected to the photodiode 103b. Hereinafter, the photodiodes 103a and 103b included in one of the pixels 101 are collectively referred to as a light receiving unit where appropriate. One microlens 23 is positioned so as to cover one light receiving unit and collects light as a light flux into the light receiving unit. Specifically, one microlens is disposed for one light receiving unit. The light collected by the microlens 23 is incident on the plurality of photoelectric conversion units included in the pixel 101 corresponding to the microlens 23. The imaging apparatus of this embodiment includes microlens array including a plurality of microlenses.

Figure 3B:
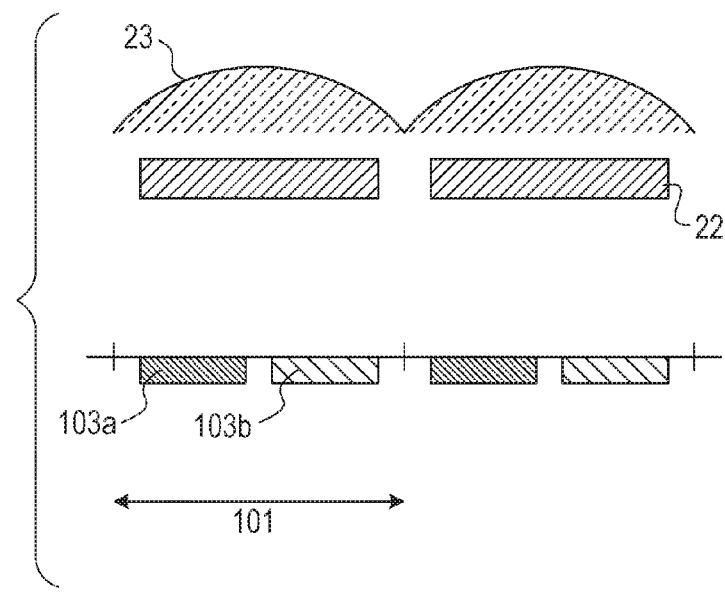

FIG. 3B is a cross-sectional view of two of the pixels 101 taken along a line IIIB of FIG. 3A. A color filter 22 is disposed between the microlens 23 and the photodiodes 103a and 103b.

Figure 4:
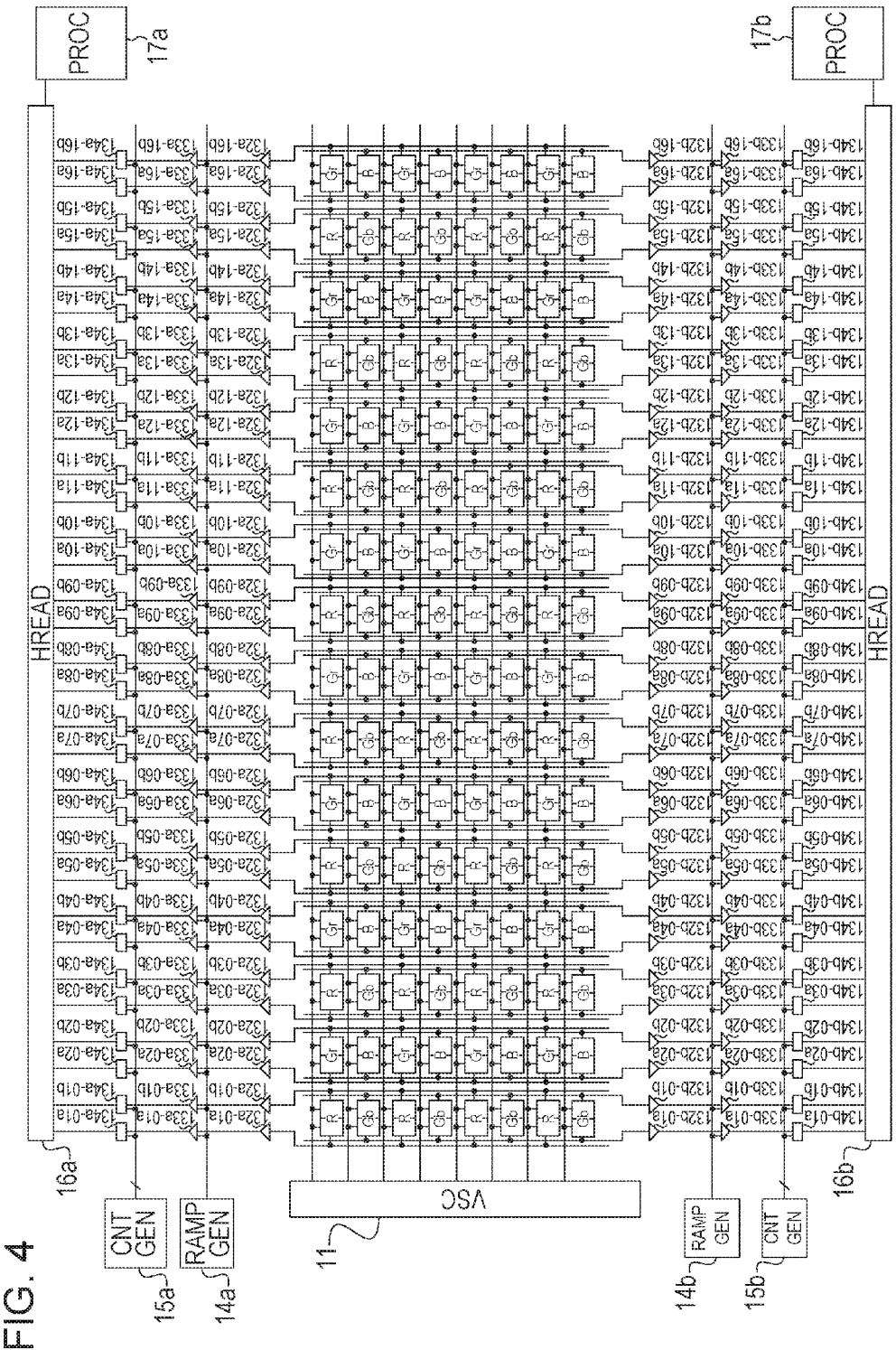
FIG. 4 is a diagram illustrating the configuration of the imaging apparatus.

FIG. 4 is a diagram illustrating the configuration of the imaging apparatus 1 according to this embodiment in detail.

An output signal process performed by the signal processors 17a and 17b of the imaging apparatus 1 of this embodiment will be described with reference to FIG. 4.

In FIG. 4, colors of the color filters 22 of the individual pixels 101 illustrated in FIG. 3B are illustrated. R denotes red and B denotes blue. Gr and Gb denote a green color filter 22 disposed in a pixel row where red color filters 22 are disposed and a green color filter 22 disposed in a pixel row where blue color filters 22 are disposed, respectively. Note that, in FIG. 4, column numbers of the pixels 101 are added to the amplifiers 132, the comparators 133, and the memories 134. The column numbers of the pixels 101 are counted from the vertical scanning circuit 11 side. Furthermore, "a" is added to the amplifiers 132, the comparators 133, and the memories 134 which process A signals output to the vertical output lines 102a. Similarly, "b" is added to the amplifiers 132, the comparators 133, and the memories 134 which process B signals output to the vertical output lines 102b. For example, A signals output from pixels 101 which are arranged in a first column and which have R color filters 22 are processed by an amplifiers 132a-01a, a comparators 133a-01a, and a memory 134a-01a.

First, a signal process associated with pixels 101 in a first row and pixels 101 in a second row will be described.

An A signal and a B signal output from a pixel 101 in the first column of the first row are amplified using the amplifiers 132a-01a and 132a-01b, respectively. The A signal and the B signal which are amplified are referred to as an "amplified A signal" and an "amplified B signal", respectively. Then digital signals obtained by AD conversion performed on the amplified A signal and the amplified B signal are stored in the memories 134a-01a and 134a-01b. The digital signal obtained by the AD conversion performed on the amplified A signal is referred to as a "digital A signal" and the digital signal obtained by the AD conversion performed on the amplified B signal is referred to as a "digital B signal".

Hereinafter, similarly, the memories 134a in the individual columns store digital A signals and digital B signals based on signals output from pixels 101 in the plurality of columns of the first row.

Furthermore, the vertical scanning circuit 11 of this embodiment simultaneously selects the pixels 101 in the first row and pixels 101 in the second row.

Therefore, the memories 134b in the individual columns store digital A signals and digital B signals based on signals output from pixels 101 in a plurality of columns of the second row.

The digital A signal and the digital B signal stored in the memories 134a and 134b are output to the signal processors 17a and 17b, respectively, when the horizontal scanning circuits 16a and 16b perform scanning.

Next, the signal process performed on the digital A signals and the digital B signals of the pixels 101 in the first row performed by the signal processor 17a will be described. First, a video signal process performed by the signal processors 17a and 17b will be described.

The signal processor 17a adds the digital A signal stored in the memory 134a-01a to the digital B signal stored in the memory 134a-01b. By this, the signal processor 17a obtains a digital signal corresponding to a signal obtained in a case where charge of the photodiode 103a and charge of the photodiode 103b in the R pixel in the first column of the first row are added to each other. This digital signal is represented as a digital A+B signal. This signal is used as a video signal of the R pixel in the first column of the first row.

The signal processor 17a obtains digital A+B signals by performing the same addition process on digital A signals and digital B signals of the other pixels 101.

The signal processor 17b adds a digital A signal stored in a memory 134b-01a to a digital B signal stored in a memory 134b-01b. By this, the signal processor 17b obtains a digital A+B signal corresponding to a signal obtained in a case where charge of a photodiode 103a and charge of a photodiode 103b in a Gb pixel in the first column of the second row are added to each other. This signal is used as a video signal of the Gb pixel in the first column of the second row.

The signal processor 17b obtains digital A+B signals by performing the same addition process on digital A signals and digital B signals of the other pixels 101.

Next, generation of a focus detection signal performed in parallel to the video signal process will be described.

Figure 5A:
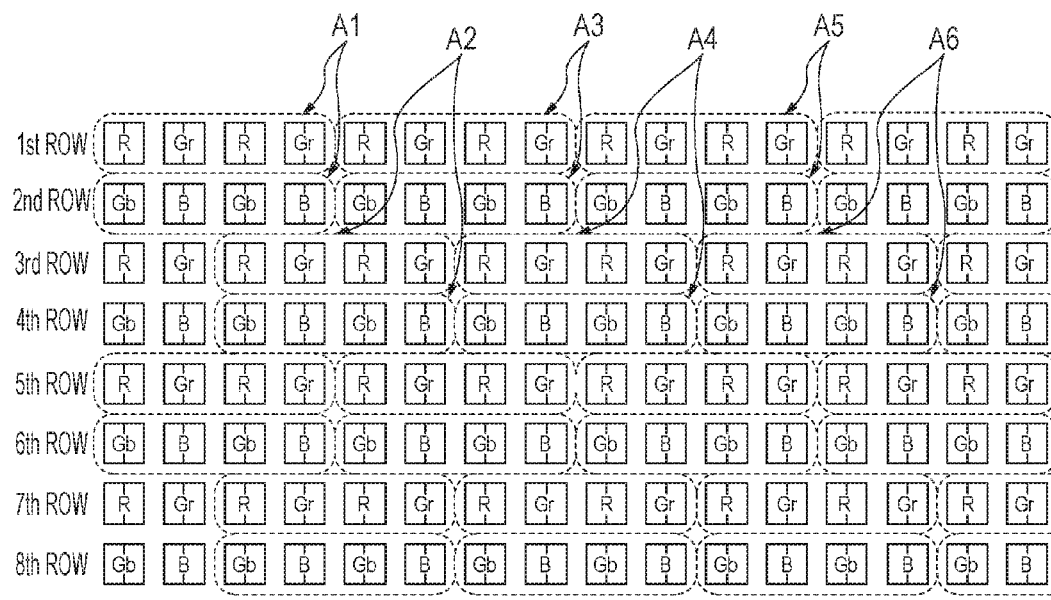
FIGS. 5A and 5B are diagrams illustrating a generation pattern of intra-group addition signals and inter-group addition signals.

The signal processors 17a and 17b generate signals by adding digital A signals of four pixels 101 which are arranged adjacent to each other in the same row and which are included in the same groups surrounded by dotted lines as illustrated in FIG. 5A. Such a signal obtained by adding digital A signals to one another is referred to as an intra-group addition A signal. Furthermore, the four pixels 101 in the same group are arranged adjacent to each other right-ward, that is, in a first direction, in a plan view. That is, column addresses of the four pixels 101 which are adjacent to each other and which are included in the same group are consecutive.

Furthermore, the signal processors 17a and 17b output the generated intra-group addition A signals to a system processor provided in an outside of the imaging apparatus 1. The system processor corresponds to an output signal processor 155 included in an imaging system illustrated in FIG. 15 described below, for example. The system processor adds, as denoted by A1 of FIG. 5A, an intra-group addition A signal of a first group including four pixels 101 which are adjacent to each other in the first row to an intra-group addition A signal of a group which is located in the second row and which is adjacent to the first group so as to generate a signal. The first group includes a number of a plurality of pixels which have the same row address or the same column address. In this example, the first group includes a plurality of pixels having the same row address. The signal obtained by adding the intra-addition A signals to each other is referred to as an inter-group addition A signal.

Furthermore, of two groups denoted by A3 of FIG. 5A, pixels 101 in a second group located in the first row have a value of a row address of 1 which is the same as that of the pixels 101 in the first group. However, a range from 1 to 4 of column addresses of the pixels 101 in the first group excludes a range from 5 to 8 of column addresses of the pixels 101 in the second group.

The system processor generates an inter-group addition A signal between groups in the first and second rows. The inter-group addition A signal is one of focus detection signals. The other of the focus detection signals is an inter-group addition B signal described below.

Subsequently, generation of the focus detection signals in pixels 101 in the third and fourth rows will be described. The process of generating an intra-group addition A signal performed on the pixels 101 in the first and second rows is also applied to the pixels 101 in the third and fourth rows. Of the two groups denoted by A2 of FIG. 5A, pixels 101 in a third group located in the third row have a value of a row address of 3 which is different from that of the pixels 101 of the first and second groups. Furthermore, a portion of a range from 3 to 6 of values of column addresses of the third group overlaps with the range from 1 to 4 of the values of the column addresses of the first group but the other portion does not overlap. Moreover, values 5 and 6 of the column addresses of the third group which do not overlap with the range of the values of the column addresses of the first group overlap with a portion of the range from 5 to 8 of the values of the column addresses of the second group. In addition, the range from 3 to 6 of the values of the column addresses of the third group is included in a range from 1 to 8 obtained by adding the range of the values of the column addresses of the first and second groups.

Although a process of generating an inter-group addition A signal is the same as that performed on the pixels 101 in the first and second row, the column addresses included in the group are different from the first and second rows. Specifically, the system processor, as denoted by A2 of FIG. 5A, generates an inter-group addition A signal by adding an intra-group addition A signal of the third group including the four pixels 101 which are adjacent to each other in the third row and an intra-group addition A signal of a fourth group which is located in the fourth row and which is adjacent to the third group to each other.

Next, a process of calculating a digital B signal performed by the system processor will be described. The signal processors 17a and 17b output digital A+B signals corresponding to the pixels 101 to the system processor. First, the system processor will be described taking the two groups denoted by A1 of FIG. 5A as an example. The system processor generates a signal by adding digital A+B signals of the eight pixels 101 in the two groups which have the same range of the values of the column addresses and which have row addresses different from each other by 1. A signal obtained by adding the digital A+B signals of the eight pixels 101 is referred to as an inter-group addition A+B signal. Then the system processor obtains a signal of a difference between the inter-group addition A+B signal of the two groups and an inter-group addition A signal. The obtained signal is referred to as an inter-group addition B signal.

A process of obtaining an inter-group addition B signal in the third and fourth rows is the same as a process of obtaining an inter-group addition B signal in the first and second rows. The system processor performs focus detection using the inter-group addition A signal and the inter-group addition B signal.

Figure 5B:
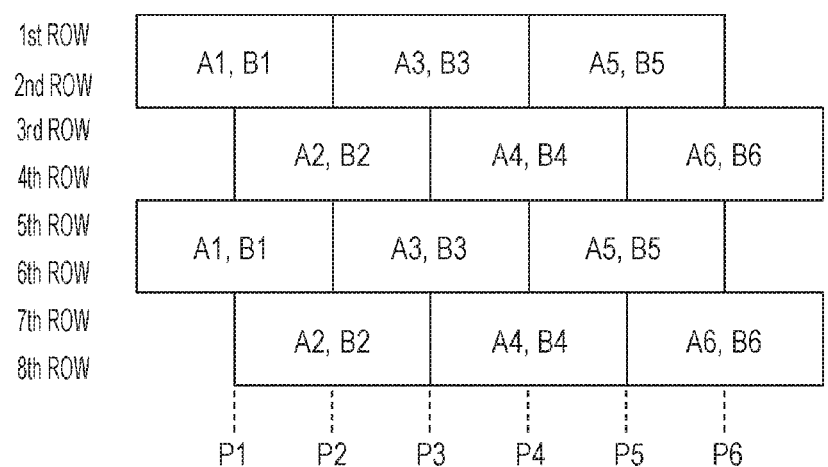

FIG. 5B is a diagram illustrating a spatial signal pattern of focus detection signals which corresponds to arrangement of the pixels 101. A1 illustrated in FIG. 5B indicates an inter-group addition A signal generated from the plurality of groups A1 illustrated in FIG. 5A. Furthermore, B1 illustrated in FIG. 5B indicates an inter-group addition B signal generated from the plurality of groups A1 illustrated in FIG. 5A.

Thereafter, the same process is performed on pairs of rows, and groups of pixels subjected to addition are shifted in a unit of two rows in a column direction in a zig-zag manner.

In FIG. 5B, P1 to P6 denote spatial sampling points of the pixels 101 in the column direction. For example, sampling points of the pixels 101 in the first and second rows are P1, P3, and P5, and sampling points of the pixels 101 in the third and fourth rows are P2, P4, and P6. Accordingly, odd-numbered sampling points and even-numbered sampling points are shifted from each other by a half cycle relative to a cycle of a row of a group including a plurality of pixels.

Figure 6:
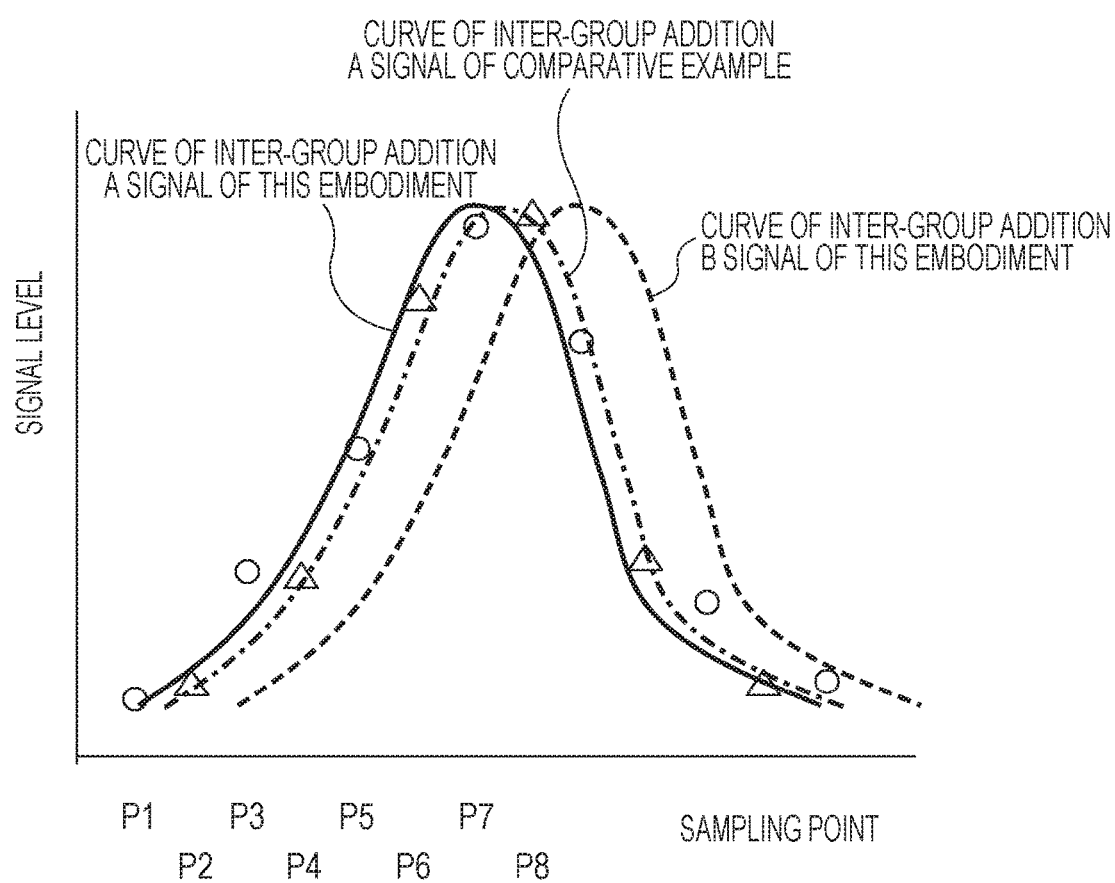
FIG. 6 is a graph illustrating the relationships between sampling points and signal levels.

FIG. 6 is a graph illustrating the relationship between sampling points and signal levels.

In the system processor, a shift of focus from a focus position is detected from a phase difference between the inter-group addition A signal and the inter-group addition B signal.

In FIG. 6, focus detection signal levels of the sampling points P1, P3, P5, and so on are indicated by circles and signal levels of the sampling points P2, P4, P6, and so on are indicated by triangles. The system processor generates a curve of inter-group addition A signals indicated by a solid line in FIG. 6 using the signal levels denoted by the circles and the triangles.

Furthermore, as with the generation of the curve of the inter-group addition A signals, the system processor generates a curve of inter-group addition B signals indicated by a dotted line in FIG. 6.

Figure 7:
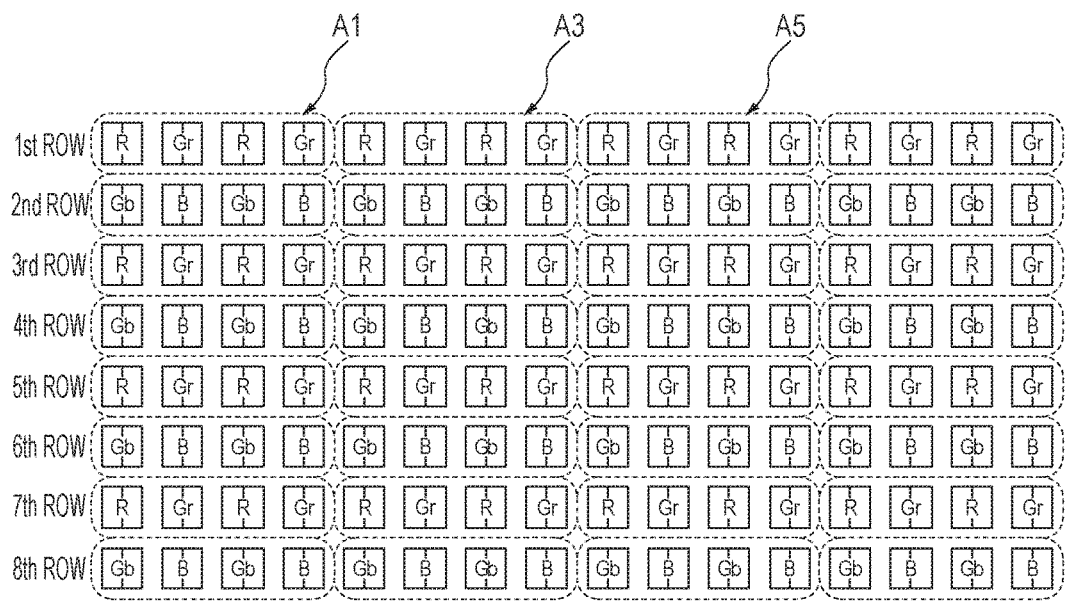
FIGS. 7A and 7B are diagrams illustrating a generation pattern of intra-group addition signals and inter-group addition signals.

Meanwhile, another method for generating a focus detection signal is illustrated in FIGS. 7A and 7B as a comparative example.

In FIG. 7A, column addresses of pixels 101 in a first group and column addresses of pixels 101 in a third group are the same as each other. FIG. 7B is a diagram illustrating a spatial signal pattern of inter-group addition A signals and inter-group addition B signals generated in groups illustrated in FIG. 7A. The number of sampling points of focus detection signals are three, that is, P1, P3, and P5.

A curve of the inter-group addition A signals obtained in this case is indicated by a dashed line in FIG. 6.

In this embodiment, resolution of the inter-group addition A signals and the inter-group addition B signals in a horizontal direction may be improved when compared with the comparative example. Therefore, accuracy of the focus detection may be improved when compared with the comparative example.

Although the inter-group addition A signals have been described, resolution of the inter-group addition B signals in the horizontal direction may be improved in this embodiment when compared with the comparative example.

With the technique described above, the imaging apparatus 1 outputs a signal obtained by adding focus detection signals of a plurality of pixels (four pixels in this embodiment) to one another. By this, the number of focus detection signals output by the imaging apparatus 1 is reduced (¼ in this embodiment), and a period of time required for output of the focus detection signals from the imaging apparatus 1 may be reduced. Specifically, an operation of outputting the focus detection signals may be performed by the imaging apparatus 1 at high speed. Furthermore, in this embodiment, the column addresses of some of the corresponding pixels 101 of the plurality of inter-group addition signals are the same as each other, and the column addresses of the other of the corresponding pixels 101 are different from each other. By this, resolution of the focus detection signals in the horizontal direction may be improved when compared with the comparative example in which all the column addresses of the corresponding pixels 101 of the plurality of inter-group addition signals are the same as each other. Accordingly, improvement of accuracy of the focus detection is realized in this embodiment. Consequently, the imaging apparatus 1 of this embodiment may output a plurality of inter-group addition signals in which the column addresses of some of the pixels of a plurality of inter-group addition signals are the same as each other, and the column addresses of the other of the pixels are different from each other. Accordingly, the imaging apparatus 1 of this embodiment contributes to the improvement of the accuracy of the focus detection.

Figure 8:
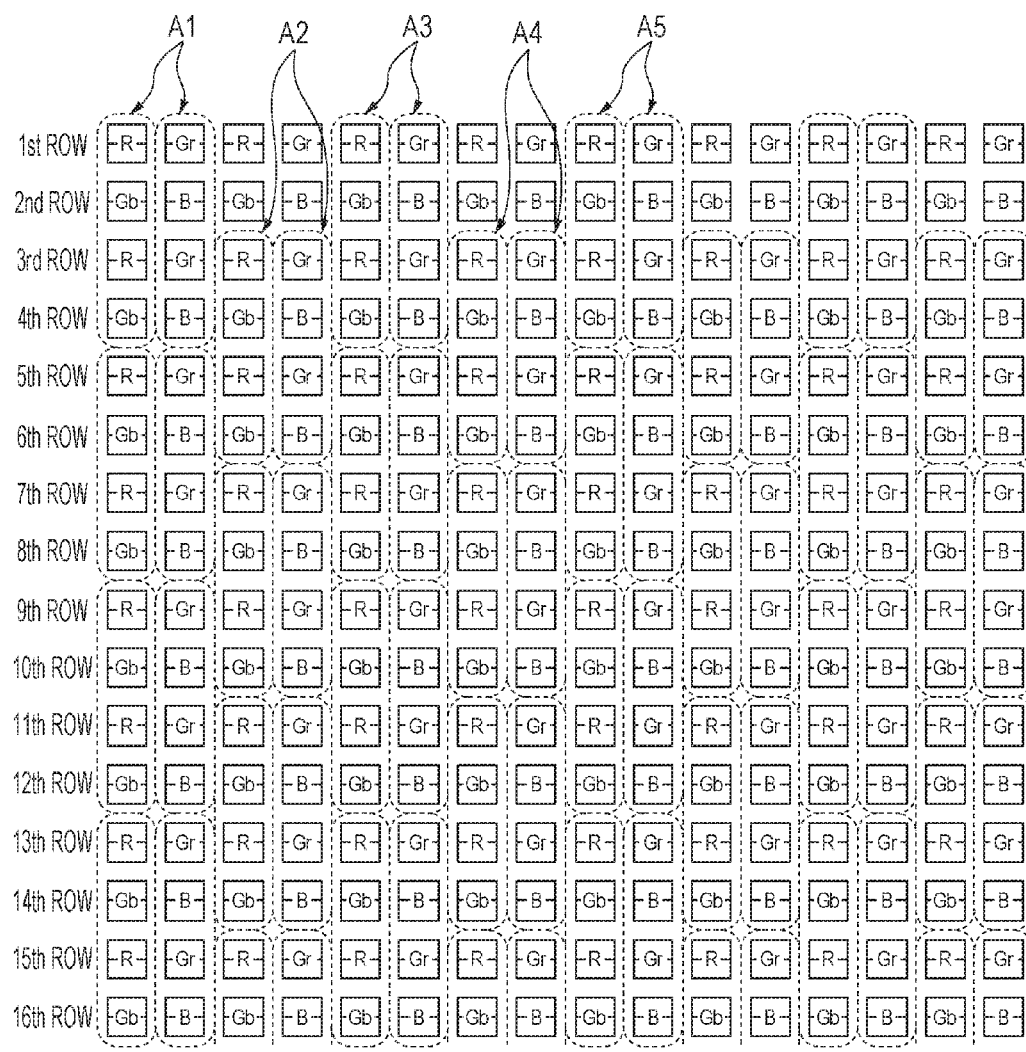
FIG. 8 is a diagram illustrating a generation pattern of intra-group addition signals and inter-group addition signals.

In this embodiment, a group of columns subjected to addition is changed depending on a row when the addition is performed in the column direction. As another example, as illustrated in FIG. 8, the signal processors 17a and 17b perform a process of adding digital A signals of four pixels 101 in first to fourth rows in each of first and second columns. Furthermore, the signal processors 17a and 17b perform a process of adding digital A signals of four pixels 101 in third to sixth rows in each of third and fourth columns. The system processor obtains an inter-group addition A signal by adding intra-group addition A signals of the first and second columns to each other. Furthermore, the system processor obtains an inter-group addition A signal by adding intra-group addition A signals of the third and fourth columns to each other. Thereafter, the process described above is performed. In this case, this embodiment has an effect of improving accuracy of the focus detection in a vertical direction.

Note that, although the case where the digital A signals of the four pixels 101 are added to one another is described as an example in this embodiment, the number of signals to be added is not limited to four. An intra-group addition signal is obtained by adding digital A signals of at least two of the pixels 101.

Furthermore, the case where the intra-group addition signals and the inter-group addition signals are digital signals is described as an example in this embodiment. However, the embodiment is not limited to this example. For example, in a configuration in which the imaging apparatus 1 does not include the comparators 133, the signal processors 17a and 17b may obtain an intra-group addition signal by adding analog A signals output from a number of the pixels 101. Similarly, an inter-group addition signal may be generated by adding analog intra-group addition signals to one another.

Moreover, although the first group including the pixels 101 in the first to fourth columns of the first row and the second group including the pixels 101 in the fifth to eighth columns of the first row are positioned adjacent to each other in FIG. 5A, other pixels 101 may be disposed between the first and second groups. At least a portion of a range of the row addresses or the column addresses of the pixels 101 included in the first group overlaps with a portion of a range of the row addresses or the column addresses of the pixels 101 included in the third group. Furthermore, the other portion of the range of the row addresses or the column addresses of the pixels 101 included in the first group does not overlap with the other portion of the range of the row addresses or the column addresses of the pixels 101 included in the third group. By this, improvement of the resolution in the horizontal direction (or the vertical direction) is realized in the focus detection.

Note that the case where the signal processors 17a and 17b included in the imaging apparatus 1 formed on the single semiconductor substrate generate intra-group addition signals is described as an example. The embodiment is not limited to this example, and a case where the embodiment is employed in an imaging system illustrated in FIG. 15 below will be described as an example. The imaging apparatus 1 of this embodiment may be employed as an imaging apparatus 154 of FIG. 15. In this imaging system, the output signal processor 155 is formed on a semiconductor substrate which is different from the semiconductor substrate including the imaging apparatus 154 formed thereon. The output signal processor 155 may generate intra-group addition signals.

Second Embodiment

Figure 9:
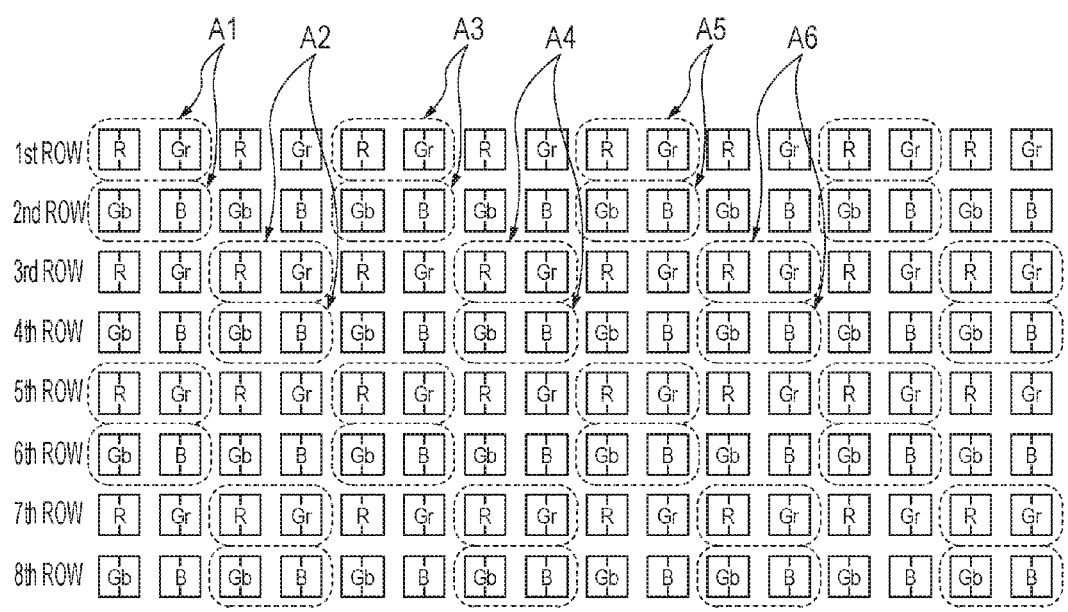
FIG. 9 is a diagram illustrating a generation pattern of intra-group addition signals and inter-group addition signals.

FIG. 9 is a diagram illustrating focus detection signals according to a second embodiment of the present invention.

Portions different from those of the first embodiment are mainly described hereinafter. In this embodiment, a range of column addresses of a third group does not overlap with ranges of column addresses of first and second groups.

A signal processor 17a generates an intra-group addition A signal by adding digital A signals of pixels 101 in first and second columns of a first row. Furthermore, the imaging apparatus 1 does not output a signal based on A signals of pixels 101 in third and fourth columns of the first row. In this non-output operation, the pixels 101 may not output A signals. Alternatively, the pixels 101 may output A signals, corresponding memories 134 may store digital A signals, and horizontal scanning circuits 16a and 16b may not select the memories 134.

In this embodiment, in columns in a certain row in which signals based on A signals are not output from the imaging apparatus 1, signals based on A signals are output in the columns of another row. Accordingly, an effect of improvement of resolution of focus detection in a horizontal direction is attained when compared with a case where signals based on A signals are not output from the imaging apparatus 1 in all rows of a certain column.

Third Embodiment

In this embodiment, signal processors 17a and 17b differentiate a combination of columns for generating an intra-group addition A signal in an odd-numbered frame and that in an even-numbered frame.

An operation in a first frame is the same as that of the first embodiment. Focus detection signals are added to one another to be output as illustrated in the pattern of FIG. 5B.

An operation in a second frame will be described.

As with the first embodiment, signals of pixels 101 are stored in memories 134 after being subjected to AD conversion and are transmitted to the signal processors 17a and 17b through horizontal scanning circuits 16a and 16b. Therefore, a description of this process is omitted.

Furthermore, a video signal process is also the same as that of the first embodiment, and therefore, a description thereof is omitted.

Hereinafter, a process of focus detection signals will be described.

When signals are output from first and second rows in the second frame, the signal processor 17a performs the following process.

The signal processor 17a obtains an intra-group addition A signal (A2) by adding signals of pixels in third to sixth columns of the first row stored in memories 134a-03a, 134a-04a, 134a-05a, and 134a-06a to one another.

Similarly, intra-group addition A signals (A4, A6, and so on) are obtained by adding signals of four pixels in seventh to tenth columns of the first row to one another and adding signals of four pixels in 11th to 14th columns of the first row to one another.

Furthermore, the signal processor 17b performs the same process so as to obtain intra-group addition A signals (A2, A4, A6, and so on) by adding signals of four pixels in third to sixth columns of the second row to one another, adding signals of four pixels in seventh to tenth columns of the second row to one another, and adding signals of four pixels in 11th to 14th columns of the second row to one another.

In this way, since column addresses of focus detection signals are differentiated in a unit of frame, focus detection signals for compensating for sampling points of pixels 101 in a column direction may be obtained in a unit of frame at a time of movie shooting, and accordingly, further improvement of focus detection accuracy may be attained.

Fourth Embodiment

Figure 10:
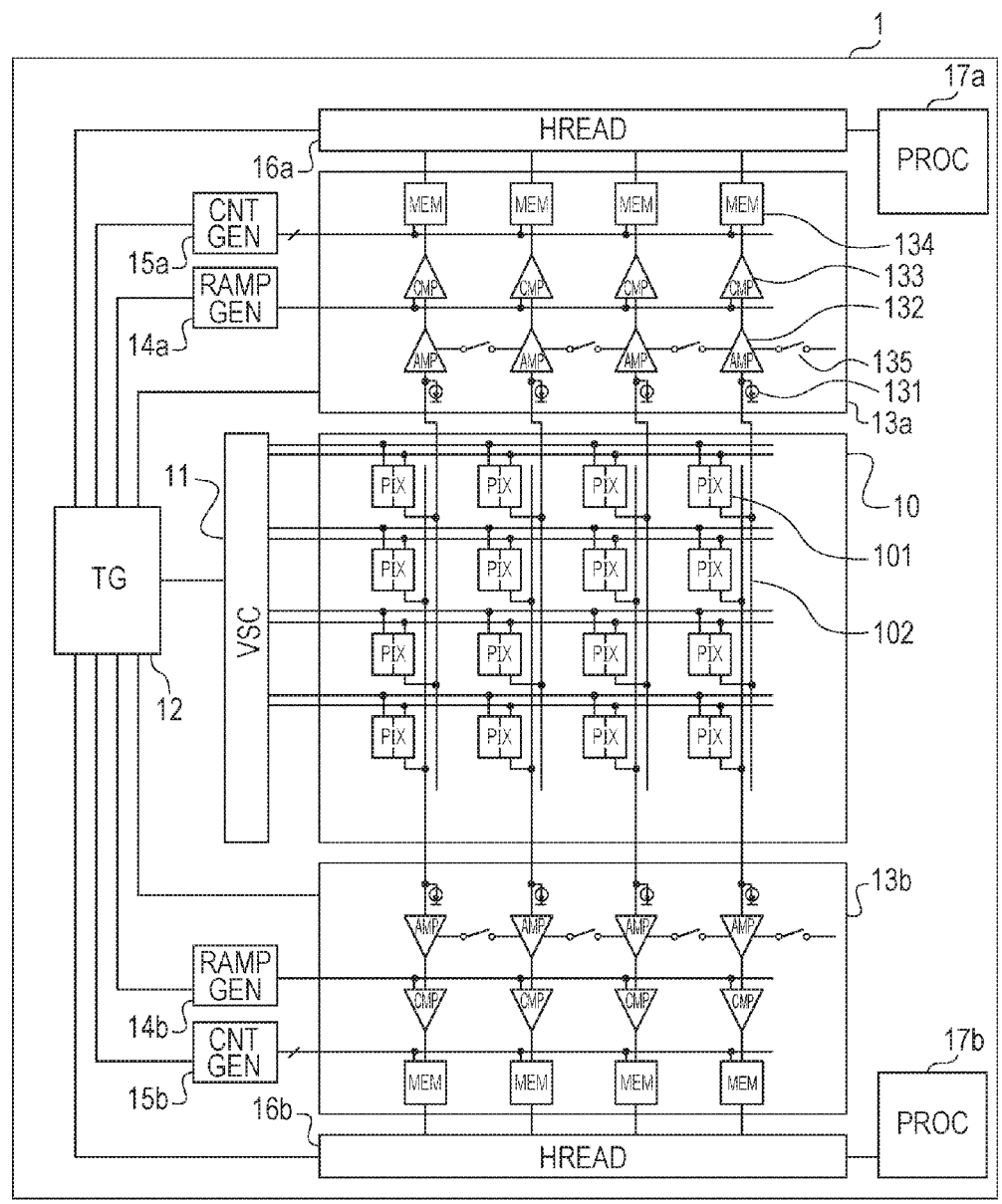
FIG. 10 is a diagram illustrating a configuration of an imaging apparatus.

FIG. 10 is a diagram schematically illustrating the imaging apparatus 1 according to a fourth embodiment of the present invention.

The fourth embodiment is different from the first embodiment in a pixel configuration and a method for adding pixel signals to one another.

A pixel unit 10 includes pixels 101 arranged in a matrix, and signals of some of the pixels 101 selected by a vertical scanning circuit 11 are output to vertical output lines 102.

Pixels 101 in a first row are connected to a reading circuit 13a and pixels 101 in a second row are connected to a reading circuit 13b. Similarly, pixels 101 in odd-numbered rows are connected to the reading circuit 13a and pixels 101 in even-numbered rows are connected to the reading circuit 13b.

Each of the reading circuits 13a and 13b includes a current source 131, and signals output from the vertical output lines 102 are input to amplifiers 132.

Comparators 133 compare signals output from the amplifiers 132 with ramp signals output from ramp generators 14a and 14b, and when both the signals have the same potential, outputs from the comparators 133 are inverted. Count signal generators 15a and 15b which perform count-up in proportion to time generate count signals, and memories 134 store count signals generated when outputs of the comparators 133 are inverted. By this, the memories 134 store values in proportion to time obtained by the time when the comparators 133 are inverted. The values are in proportion to pixel outputs, that is, the values are obtained by performing AD conversion on the pixel outputs.

Horizontal scanning circuits 16a and 16b successively scan the values stored in the memories 134 in individual columns and transmit the values to the signal processors 17a and 17b.

The signal processors 17a and 17b process the values stored in the memories 134 in the individual columns so as to generate output signals.

Note that switches 135 are disposed to connect the adjacent amplifiers 132 to each other, and signals may be added to one another in a column direction.

Figure 11:
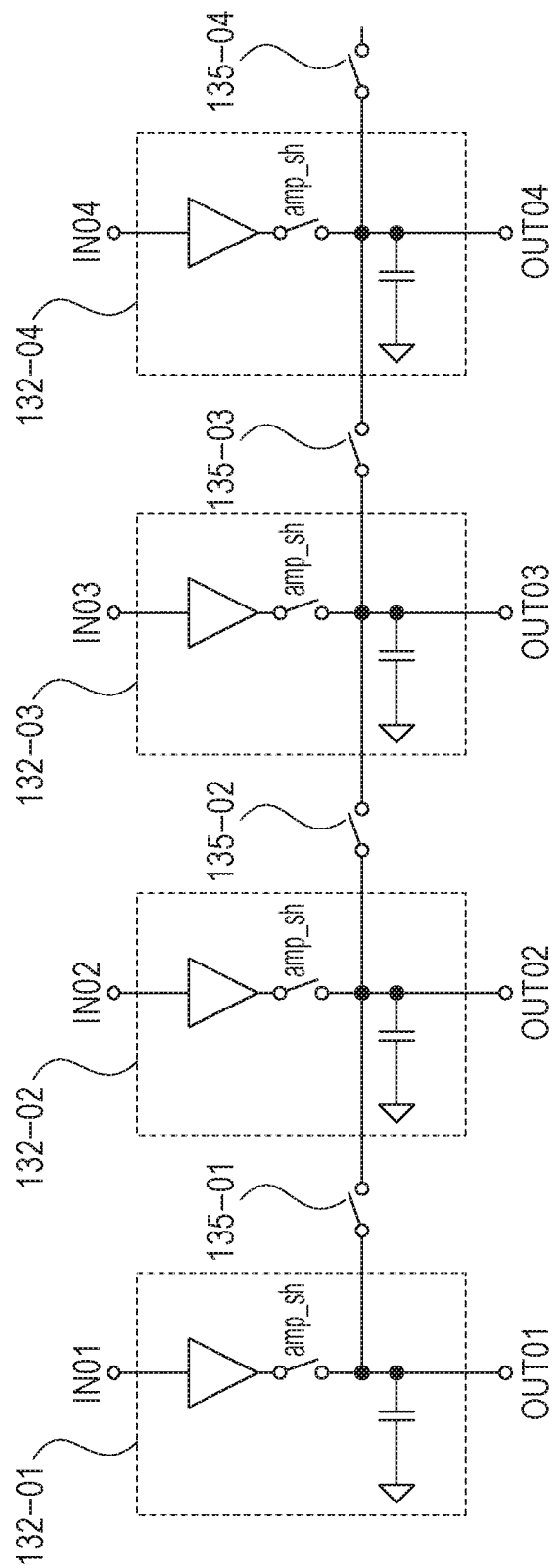
FIG. 11 is a diagram illustrating a configuration of a reading circuit of the imaging apparatus.

FIG. 11 is a diagram illustrating connections between circuits included in the amplifiers 132 and the switches 135.

Each of the amplifiers 132 includes a sampling-and-holding capacitance, and when amp_sh is brought into a high level, an output is sampled whereas when amp_sh is brought into a low level, an output is held.

When addition is not performed and data in each pixel is to be independently output, all the addition switches (135-01, 135-02, 135-03, 135-04, and so on) are turned off. A signal to be output based on a signal input to IN01 is supplied to OUT01, and a signal to be output based on a signal input to IN02 is supplied to OUT02.

When data of four pixels are to be added in the column direction and to be output, amp_sh is brought into a low state so that an output is held, and in this state, the switches 135-01, 135-02, and 135-03 are turned on and the switch 135-04 is turned off.

By this, signals output from the amplifiers 132-01, 132-02, 132-03, and 132-04 are added to one another.

Figure 12A:
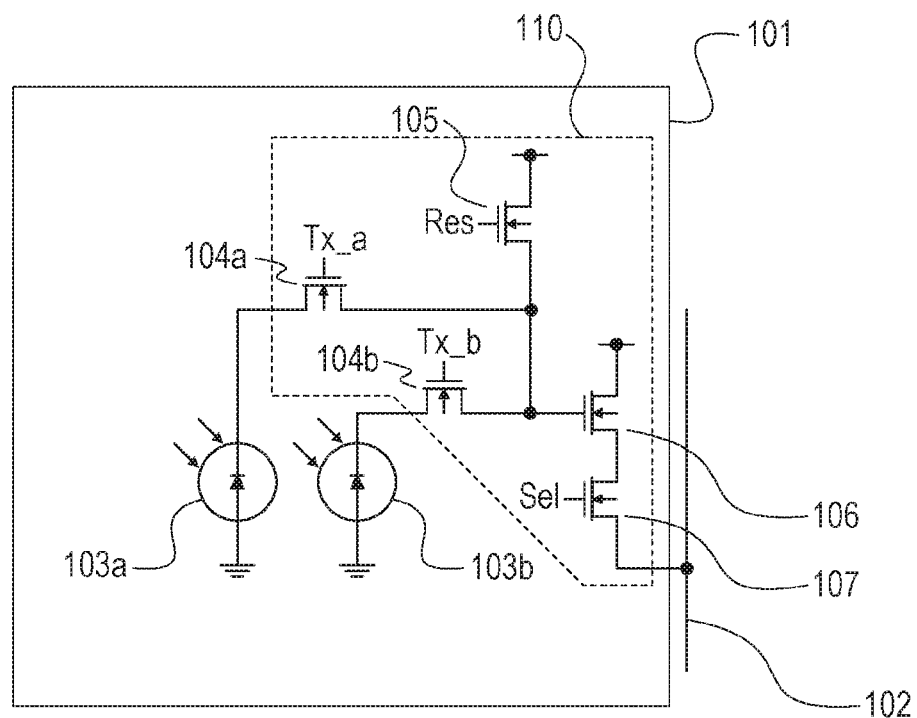
FIGS. 12A and 12B are diagrams illustrating a configuration of a pixel and an operation of the pixel, respectively.

FIG. 12A is a diagram illustrating an equivalent circuit of an inside of a pixel 101 according to this embodiment.

The pixel 101 includes two photodiodes 103a and 103b. The two photodiodes 103a and 103b are connected to a single pixel circuit 110. The pixel circuit 110 includes transfer transistors 104a and 104b, a reset transistor 105, an output transistor 106, and a selection transistor 107.

Figure 12B:
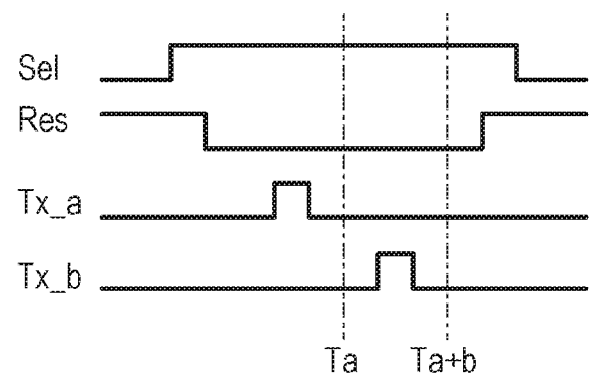

FIG. 12B is a diagram illustrating a method for driving the pixel circuit 110.

The vertical scanning circuit 11 turns on the selection transistor 107 and connects the output transistor 106 of the pixel 101 to the vertical output line 102. Thereafter, the vertical scanning circuit 11 turns off the reset transistor 105. By this, an input node of the output transistor 106 is electrically brought into a floating state. Subsequently, the vertical scanning circuit 11 turns on the transfer transistor 104a. By this, charge accumulated in the photodiode 103a is transferred to the input node of the output transistor 106. At this time point (Ta), the vertical output line 102 has voltage amplitude corresponding to a signal charge amount of the photodiode 103a. Specifically, the pixel 101 outputs an A signal which is a first signal based on charge accumulated in one of the plurality of photoelectric conversion units.

Subsequently, the vertical scanning circuit 11 turns on the transfer transistor 104b. By this, signal charge accumulated in the photodiode 103b is transferred to the input node of the output transistor 106. Therefore, the signal charge of the photodiode 103b is transferred to the input node of the output transistor 106 in addition to the signal charge of the photodiode 103a which has been transferred. Accordingly, at this time point (Ta+b), the vertical output line 102 has a voltage amplitude corresponding to a sum of the signal charge amounts of the photodiodes 103a and 103b. Specifically, the pixel 101 outputs an A+B signal which is a second signal based on charge accumulated in all the plurality of photoelectric conversion units.

When the signal of the vertical output line 102 is read at the time point Ta+b, a signal of an entire light receiving unit is read and is usable as a video signal.

Note that the transfer transistor 104a may be turned on again when the transfer transistor 104b is turned on. In this case, a timing of an end of a charge accumulation period of the A signal and that of a B signal are the same as each other. Accordingly, degradation of image quality (false color, image lag, and the like generated when a moving body is photographed, for example) caused since the timings of the ends of the charge accumulation periods of the A signal and the B signal are different from each other may be suppressed.

Figure 14:
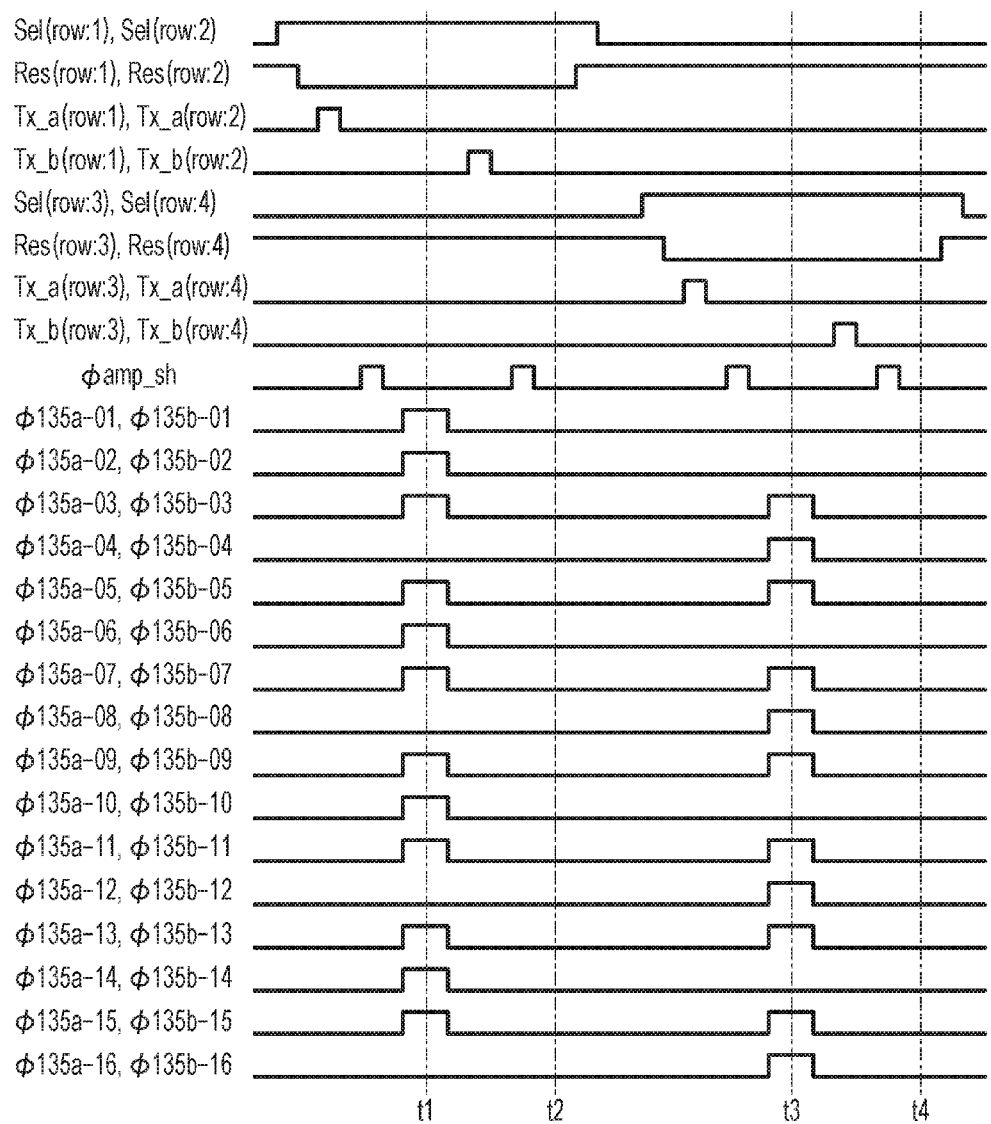
FIG. 14 is a diagram illustrating an operation of the imaging apparatus.

FIG. 13 is a diagram illustrating a configuration of the imaging apparatus 1 of FIG. 10 in detail. Hereinafter, this embodiment will be described with reference to FIGS. 13 and 14.

First, the vertical scanning circuit 11 selects first and second rows and an AD conversion operation is performed at a time point t1. Here, switches 135a-01, 135a-02, and 135a-03 are turned on and a switch 135a-04 is turned off. Furthermore, switches 135a-05, 135a-06, and 135a-07 are turned on and a switch 135a-08 is turned off. By this, signals output from amplifiers 132 in four columns are added to one another.

Similarly, switches 135b-01, 135b-02, and 135b-03 are turned on and a switch 135b-04 is turned off. Furthermore, switches 135b-05, 135b-06, and 135b-07 are turned on and a switch 135b-08 is turned off.

Accordingly, a memory 134a-01 stores a value (an intra-group addition A signal) obtained by performing AD conversion on a value obtained by adding signals of four photodiodes 103a in first to fourth columns of the first row to one another. A memory 134a-05 stores a value (an intra-group addition A signal) obtained by performing AD conversion on a value obtained by adding signals of four photodiodes 103a in fifth to eighth columns of the first row to one another.

The signal processor 17a successively outputs digital signals stored in the memories 134a-01, 134a-05, and 134a-09. By this, the intra-group addition A signal is obtained by adding the signals of the four pixels in the first to fourth columns of the first row, the intra-group addition A signal is obtained by adding the signals of the four pixels in the fifth to eighth columns of the first row, and an intra-group addition A signal is obtained by adding signals of four pixels in 9th to 12th columns of the first row.

The signal processor 17b performs the same operation.

Subsequently, an AD conversion operation is performed at a time point t2. At this time, all the switches which connect outputs of the amplifiers 132 to one another are turned off so that signals of pixels are independently read.

Accordingly, the memory 134a-01 stores a value (a digital A+B signal) obtained by performing AD conversion on a value obtained by adding signals of the photodiodes 103a and 103b in the first column of the first row to each other. The memory 134a-02 stores a value (a digital A+B signal) obtained by performing AD conversion on a value obtained by adding signals of the photodiodes 103a and 103b in the second column of the first row to each other.

The signal processor 17a successively outputs digital A+B signals stored in the memories 134a-01, 134a-02, and 134a-03. By this, a video signal of a pixel in the first column of the first row, a video signal of a pixel in the second column of the first row, a video signal of a pixel in a third column of the first row, and a video signal of a pixel in a fourth column of the first row are obtained.

The signal processor 17b performs the same operation.

Output in the first and second rows has been described hereinabove.

Subsequently, the vertical scanning circuit 11 selects third and fourth rows and an AD conversion operation is performed at a time point t3. Here, the switches 135a-01 and 135a-02 are turned off, and the switches 135a-03, 135a-04, and 135a-05 are turned on. Furthermore, the switches 135a-06 is turned off, the switches 135a-07, 135a-08, and 135a-09 are turned on, and the switch 135a-10 is turned off.

Similarly, the switches 135b-01 and 135b-02 are turned off, the switches 135b-03, 135b-04, and 135b-05 are turned on, and the switch 135b-06 is turned off. Furthermore, the switches 135b-07, 135b-08, and 135b-09 are turned on and the switch 135b-10 is turned off.

Accordingly, a memory 134a-03 stores a value (an intra-group addition A signal) obtained by performing AD conversion on a value obtained by performing addition average on signals of four photodiodes 103a in the third to sixth columns of the third row. A memory 134a-07 stores a value (an intra-group addition A signal) obtained by performing AD conversion on a value obtained by adding signals of four photodiodes 103a in the seventh to tenth columns of the third row to one another.

The signal processor 17a successively outputs the intra-group addition A signals stored in the memories 134a-03, 134a-07, and 134a-11. By this, the intra-group addition A signal is obtained by adding the signals of the four pixels in the third to sixth columns of the third row, the intra-group addition A signal is obtained by adding the signals of the four pixels in the seventh to tenth columns of the third row, and an intra-group addition A signal is obtained by adding signals of four pixels in 11th to 14th columns of the third row.

The signal processor 17b performs the same operation.

Subsequently, an AD conversion operation is performed at a time point t4. Here, all the switches which connect outputs of the amplifiers 132 to one another are turned off so that signals of the pixels are independently read.

Accordingly, the memory 134a-01 stores a value (a digital A+B signal) obtained by performing AD conversion on a value obtained by adding signals of photodiodes 103a and 103b in the first column of the third row to one another. The memory 134a-02 stores a value (a digital A+B signal) obtained by performing AD conversion on a value obtained by adding signals of photodiodes 103a and 103b in the second column of the third row to one another.

The signal processor 17a successively outputs the digital A+B signals stored in the memories 134a-01, 134a-02, and 134a-03. In this way, a video signal of a pixel in the first column of the third row, a video signal of a pixel in the second column of the third row, a video signal of a pixel in the third column of the third row, and a video signal of a pixel in the fourth column of the third row are obtained.

The signal processor 17b performs the same operation. By this, a video signal of a pixel in the first column of the fourth row, a video signal of a pixel in a second column of the fourth row, a video signal of a pixel in a third column of the fourth row, and a video signal of a pixel in a fourth column of the fourth row are obtained.

Output in the third and fourth rows has been described hereinabove.

Thereafter, the operation performed for the output of the first and second rows is performed for output of the fifth and sixth row, and the operation performed for the output of the third and fourth rows is performed for output in the seventh and eighth rows. This process is repeatedly performed.

Accordingly, as video signals, data of pixels in the individual columns is successively output starting from the first column of the first row. As focus detection signals, the intra-group addition A signal in the first to fourth columns and the intra-group addition A signal in the fifth to eighth columns are output from the first and second row, and the intra-group addition A signal in the third to sixth columns and the intra-group addition A signal in the seventh to tenth columns are output from the third and fourth rows.

The relationship in a group for generating an intra-group addition A signal is the same as that of the first embodiment illustrated as the pattern of FIG. 5B. Groups of pixels to be added in different rows are shifted in a column direction in a zig-zag manner.

Accordingly, the effect of the first embodiment may be obtained also in this embodiment.

Furthermore, the operations of the second and third embodiments may be employed in the imaging apparatus of this embodiment.

Fifth Embodiment

A fifth embodiment relates to an imaging system including the imaging apparatus 1 according to any one of the first to fourth embodiments.

Figure 15:
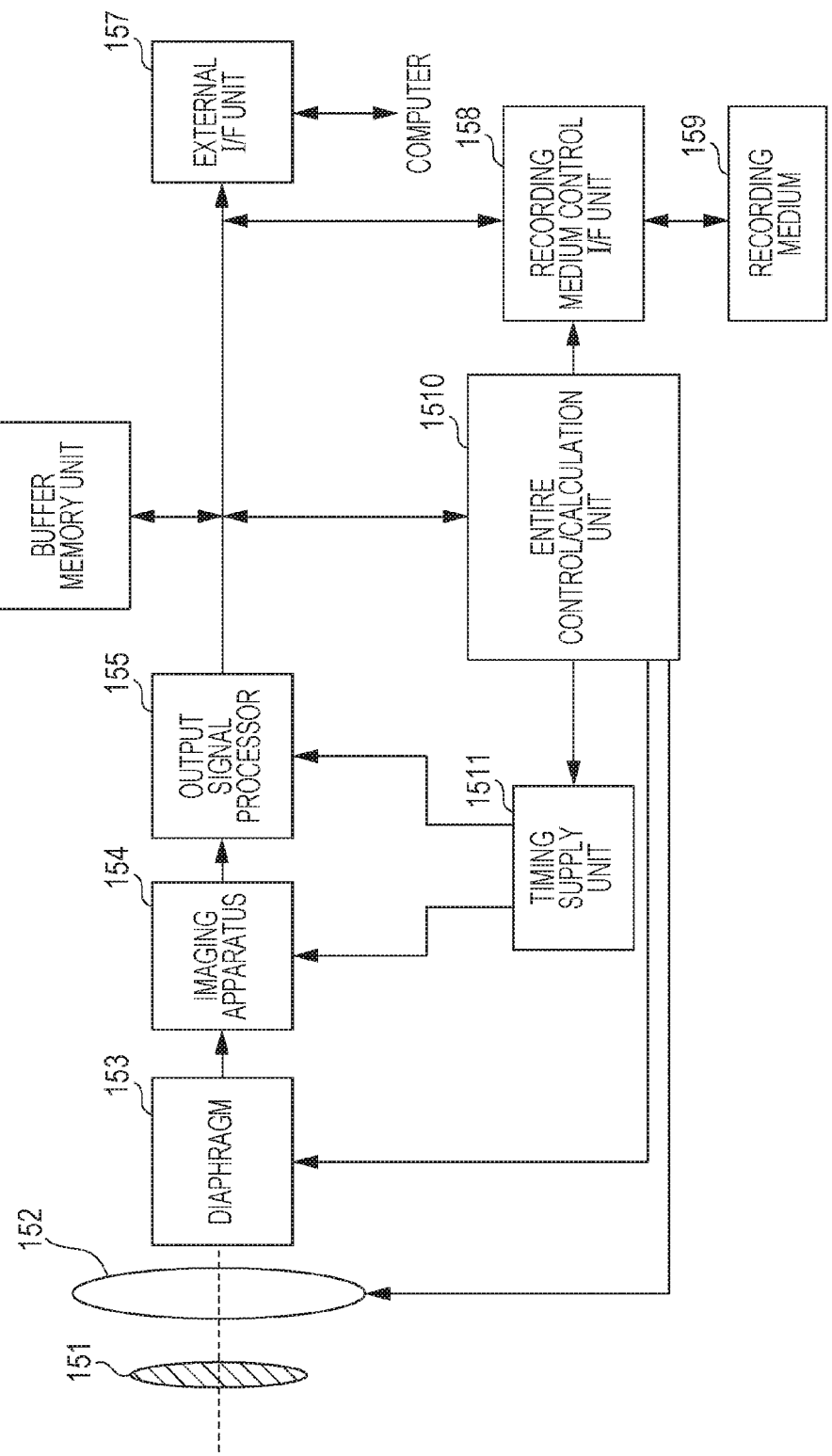
FIG. 15 is a diagram illustrating a configuration of an imaging system.

Examples of the imaging system include a digital still camera, a digital camcorder, and a surveillance camera. FIG. 15 is a diagram schematically illustrating a case where an imaging apparatus is employed in a digital still camera which is an example of the imaging system.

The imaging system of FIG. 15 includes a barrier 151 for protecting a lens 152, the lens 152 for forming an optical image of a subject on an imaging apparatus 154, and a diaphragm 153 for changing an amount of light transmitted through the lens 152. The lens 152 and the diaphragm 153 are included in an optical system which collects light into the imaging apparatus 154. The imaging system of FIG. 15 further includes an output signal processor 155 which processes a signal output from the imaging apparatus 154. The output signal processor 155 performs various correction processes and various compression processes where appropriate before outputting a signal.

The imaging system illustrated in FIG. 15 further includes a buffer memory unit 156 for temporarily storing image data and an external interface unit 157 for communication with an external computer and the like. The imaging system further includes a detachable recording medium 159, such as a semiconductor memory, for recording or reading imaging data and a storage medium control interface unit 158 for performing recording or reading on the recording medium 159. Furthermore, the solid imaging system includes an entire control/calculation unit 1510 for performing various calculation processes and controlling the entire digital still camera and a timing supply unit 1511 for outputting various timing signals to the imaging apparatus 154 and the output signal processor 155. Here, the timing signal or the like may be supplied from an outside, and the imaging system at least includes the imaging apparatus 154 and the output signal processor 155 which processes a signal output from the imaging apparatus 154.

The output signal processor 155 may be the system processor described in the first to fourth embodiments. Specifically, the output signal processor 155 generates a signal by subtracting a digital A signal from a digital A+B signal. Thereafter, the output signal processor 155 performs focus detection employing a phase difference detection method using a digital A signal and a digital B signal. Furthermore, the output signal processor 155 forms an image using the digital A+B signal.

As described above, the imaging system of this embodiment may employ the imaging apparatus 154 so as to perform the focus detection operation and the imaging operation.

Note that the foregoing embodiments are merely concrete examples of the present invention, and the technical scope of the present invention is not limited by the foregoing embodiments. That is, the present invention may be embodied in various forms without departing from the technical scope and main features of the present invention. Furthermore, the embodiments described above may be appropriately combined with each other.

According to the present invention, a signal output operation of an imaging element may be performed at high speed while degradation of accuracy of focus detection is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-100292, filed May 15, 2015, which is hereby incorporated by reference herein in its entirety.

What is claimed is:

1. An imaging apparatus comprising:
a plurality of pixels each of which includes a plurality of photoelectric conversion units,
wherein each of the plurality of pixels outputs a first signal based on charge generated by one of the plurality of photoelectric conversion units,
wherein the imaging apparatus includes
a first step of adding first signals of a plurality of pixels which have a same row address and consecutive column addresses,
a second step of adding first signals which have the same row address and consecutive column addresses, and
a third step of adding first signals which have the same row address and consecutive column addresses,
wherein row addresses of the plurality of pixels having the signals added to one another in the first step are the same as row addresses having the signals added to one another in the second step, and column addresses of the plurality of pixels having the signals added to one another in the first step are different from column addresses having the signals added to one another in the second step,
wherein the row addresses having the signals added to one another in the first step are different from row addresses having the signals added to one another in the third step, a portion of a range of column addresses having the signals added to one another in the first step overlaps with a portion of a range of column addresses having the signals added to one another in the third step, and the other portion of the range of column addresses having the signals added to one another in the first step does not overlap with the other portion of the range of column addresses having the signals added to one another in the third step, and
wherein the row addresses having the signals added to one another in the second step are different from the row addresses having the signals added to one another in the third step, a portion of the range of the column addresses having the signals added to one another in the second step overlaps with a portion of the range of the column addresses having the signals added to one another in the third step, and the other portion of the range of the column addresses having the signals added to one another in the second step does not overlap with the other portion of the range of the column addresses having the signals added to one another in the third step.

2. An imaging apparatus comprising:
a plurality of pixels arranged in a plurality of rows and a plurality of columns,
wherein each of the plurality of pixels has a plurality of photoelectric conversion units each of which generates charge,
wherein each of the plurality of pixels outputs a first signal based on the generated charge,
wherein the imaging apparatus includes
a first group including a number of the plurality of pixels which are adjacent to one another and which have the same row address or the same column address,
a second group including a number of the plurality of pixels which are adjacent to one another and which have the same row address or the same column address, and a third group including a number of the plurality of pixels which are adjacent to one another and which have the same row address or the same column address, wherein either values of the row addresses of the plurality of pixels included in the first group are all the same as values of the row addresses included in the second group and a range of values of the column addresses included in the first group excludes a range of values of the column addresses included in the second group or values of the column addresses of the plurality of pixels included in the first group are all the same as values of the column addresses included in the second group and a range of values of the row addresses included in the first group excludes a range of values of the row addresses included in the second group, wherein either the values of the row addresses included in the first group are different from values of the row address included in the third group or the values of the column addresses included in the first group are different from values of the column addresses included in the third group, wherein either a portion of a range of the row addresses included in the first group overlaps with a portion of a range of the row addresses included in the third group and the other portion of the range of the row addresses included in the first group does not overlap with the other portion of the range of the row addresses included in the third group, or a portion of a range of the column addresses included in the first group overlaps with a portion of a range of the column addresses included in the third group and the other portion of the range of the column addresses included in the first group do not overlap with the other portion of the range of the column addresses included in the third group, wherein either a portion of a range of the row addresses included in the second group overlaps with a portion of a range of the row addresses included in the third group and the other portion of the range of the row addresses included in the second group does not overlap with the other portion of the range of the row addresses included in the third group, or a portion of a range of the column addresses included in the second group overlaps with the portion of the range of the column addresses included in the third group and the other portion of the range of the column addresses included in the second group does not overlap with the other portion of the range of the column addresses included in the third group, and wherein the imaging apparatus further includes a signal processor which generates
 a first intra-group addition signal obtained by adding signals based on the first signals included in the first group to one another,
 a second intra-group addition signal obtained by adding signals based on the first signals included in the second group to one another, and
 a third intra-group addition signal obtained by adding signals based on the first signals included in the third group to one another.

3. The imaging apparatus according to claim 2, wherein either the other portion of the range of the row addresses included in the third group overlaps with a portion of the range of the row addresses included in the second group or the other portion of the range of the column addresses included in the third group overlaps with a portion of the range of the column addresses included in the second group.

4. The imaging apparatus according to claim 2, wherein the ranges of the others of the row addresses and the column addresses of the first to third groups are different between the first and second frames.

5. The imaging apparatus according to claim 2, wherein each of the plurality of pixels arranged in the plurality of rows and the plurality of columns outputs a second signal based on the charge generated by at least the other of the plurality of photoelectric conversion units.

6. The imaging apparatus according to claim 2, further comprising:
 fourth, fifth, and sixth groups each of which includes a number of the plurality of pixels arranged in the plurality of rows and the plurality of columns, the pixels included in the groups being different from one another,
 wherein a range of the others of the row addresses and the column addresses included in the fourth group is the same as the range of the others of the row addresses and the column addresses included in the first group, and values of the ones of the row addresses and the column addresses included in the fourth group are different from values of the ones of the row addresses and the column addresses included in the first group,
 wherein a range of the others of the row addresses and the column addresses included in the fifth group is the same as the range of the others of the row addresses and the column addresses included in the second group, and values of the ones of the row addresses and the column addresses included in the fifth group are different from values of the ones of the row addresses and the column addresses included in the second group,
 wherein a range of the others of the row addresses and the column addresses included in the sixth group is the same as the range of the others of the row addresses and the column addresses included in the third group, and values of the ones of the row addresses and the column addresses included in the sixth group are different from values of the ones of the row addresses and the column addresses included in the third group, and
 wherein the signal processor outputs
  a fourth intra-group addition signal obtained by adding signals based on first signals of the plurality of pixels included in the fourth group to one another,
  a fifth intra-group addition signal obtained by adding signals based on the first signals included in the fifth group to one another, and
  a sixth intra-group addition signal obtained by adding signals based on the first signals included in the sixth group to one another.

7. The imaging apparatus according to claim 6, wherein each of the plurality of pixels arranged in the plurality of rows and the plurality of columns outputs a second signal based on the charge generated by at least the other of the plurality of photoelectric conversion units.

8. An imaging system comprising:
 the imaging apparatus set forth in claim 6; and
 an output signal processor,
 wherein the output signal processor generates
  a first inter-group addition signal by adding the first intra-group addition signal to the fourth intra-group addition signal,
  a second inter-group addition signal by adding the second intra-group addition signal to the fifth intra-group addition signal, and a third inter-group addition signal by adding the third intra-group addition signal to the sixth intra-group addition signal.

9. An imaging apparatus comprising:
a plurality of pixels arranged in a plurality of rows and a plurality of columns,
wherein each of the plurality of pixels has a plurality of photoelectric conversion units each of which generates charge,
wherein each of the plurality of pixels outputs a first signal based on the generated charge,
wherein the imaging apparatus includes
   a first group including a number of the plurality of pixels which are adjacent to one another and which have a same row address or a same column address,
   a second group including a number of the plurality of pixels which are adjacent to one another and which have the same row address or the same column address, and
   a third group including a number of the plurality of pixels which are adjacent to one another and which have the same row address or the same column address,
wherein either values of the row addresses of the plurality of pixels included in the first group are all the same as values of the row addresses included in the second group and a range of values of the column addresses included in the first group excludes a range of values of the column addresses included in the second group or values of the column addresses of the plurality of pixels included in the first group are all the same as values of the column addresses included in the second group and a range of values of the row addresses included in the first group excludes a range of values of the row addresses included in the second group,
wherein either the values of the row addresses included in the first group are different from values of the row address included in the third group or the values of the column addresses of the plurality of pixels included in the first group are different from values of the column addresses in the third group,
wherein either the range of the values of the row addresses included in the first group overlaps with a portion of a range of the row addresses included in the third group and the other portion of the range of the row addresses included in the first group does not overlap with the other portion of the range of the row addresses included in the third group, or the range values of the column addresses included in the third group is included in the range of the values of the column addresses included in the first group and the plurality of pixels included in the second group,
wherein either the range of the row addresses included in the second group overlaps with a portion of a range of the row addresses included in the third group and the other portion of the range of the row addresses included in the second group does not overlap with the other portion of the range of the row addresses included in the third group, or the range of the column addresses included in the first group does not overlap with the range of the column addresses included in the third group,
wherein either the range of the row addresses included in the second group overlaps with a portion of a range of the row addresses included in the third group and the other portion of the range of the row addresses included in the second group does not overlap with the other portion of the range of the row addresses included in the third group, or the range of the column addresses included in the second group does not overlap with the range of the column addresses included in the third group,
wherein the imaging apparatus does not output the first signals based on pixels which have row addresses and column addresses which are the same as the ones of the row addresses and the column addresses in the first group and which are included in the range of the others of the row addresses and the column addresses in the third group, and
wherein the imaging apparatus further includes a signal processor which generates
   a first intra-group addition signal obtained by adding signals based on the first signals of the plurality of pixels included in the first group to one another,
   a second intra-group addition signal obtained by adding signals based on the first signals included in the second group to one another, and
   a third intra-group addition signal obtained by adding signals based on the first signals included in the third group to one another.

10. An imaging system comprising:
the imaging apparatus set forth in claim 7; and
an output signal processor,
wherein the output signal processor generates
   a first inter-group addition signal by adding the first intra-group addition signal to the fourth intra-group addition signal,
   a second inter-group addition signal by adding the second intra-group addition signal to the fifth intra-group addition signal, and
   a third inter-group addition signal by adding the third intra-group addition signal to the sixth intra-group addition signal, and
wherein the output signal processor performs focus detection using the first, second, and third inter-group addition signals and the second signals output from the plurality of pixels arranged in the plurality of rows and the plurality of columns.

11. An imaging system comprising:
an imaging apparatus including a plurality of pixels arranged in a plurality of rows and a plurality of columns, each of the plurality of pixels including a plurality of photoelectric conversion units which generate charge; and
a signal processor,
wherein each of the plurality of pixels outputs a first signal based on the generated charge,
wherein the imaging apparatus includes
   a first group including a number of the plurality of pixels which are adjacent to one another and which have a same row address or a same column address,
   a second group including a number of the plurality of pixels which are adjacent to one another and which have the same row address or the same column address, and
   a third group including a number of the plurality of pixels which are adjacent to one another and which have the same row address or the same column address,
wherein either values of the row addresses of the plurality of pixels included in the first group are all the same as values of the row addresses included in the second group and a range of values of the column addresses included in the first group excludes a range of values of the column addresses included in the second group or values of the column addresses of the plurality of pixels included in the first group are all the same as values of the column addresses of the plurality of pixels included in the second group and a range of values of the row addresses of the plurality of pixels included in the first group excludes a range of values of the row addresses of the plurality of pixels included in the second group, wherein either the values of the row addresses included in the first group are different from values of the row address included in the third group or the values of the column addresses included in the first group are different from values of the column addresses included in the third group, wherein either a portion of a range of the row addresses included in the first group overlaps with a portion of a range of the row addresses included in the third group and the other portion of the range of the row addresses included in the first group does not overlap with the other portion of the range of the row addresses included in the third group, or a portion of a range of the column addresses included in the first group overlaps with a portion of a range of the column addresses included in the third group and the other portion of the range of the column addresses included in the first group do not overlap with the other portion of the range of the column addresses included in the third group, wherein either a portion of a range of the row addresses included in the second group overlaps with a portion of a range of the row addresses included in the third group and the other portion of the range of the row addresses included in the second group does not overlap with the other portion of the range of the row addresses included in the third group, or a portion of a range of the column addresses included in the second group overlaps with the portion of the range of the column addresses included in the third group and the other portion of the range of the column addresses included in the second group does not overlap with the other portion of the range of the column addresses included in the third group, and wherein the signal processor generates
  a first intra-group addition signal obtained by adding signals based on the first signals of the plurality of pixels included in the first group to one another,
  a second intra-group addition signal obtained by adding signals based on the first signals included in the second group to one another, and
  a third intra-group addition signal obtained by adding signals based on the first signals included in the third group to one another.

* * * * *